United States Patent
Bridges

(10) Patent No.: US 11,220,103 B2
(45) Date of Patent: Jan. 11, 2022

(54) STROKE DIRECTION OFFSET ADJUSTMENT

(71) Applicant: Domino UK Limited, Cambridge (GB)

(72) Inventor: Richard Thomas Calhoun Bridges, Cambridge (GB)

(73) Assignee: Domino UK Limited

( * ) Notice: Subject to any disclaimer, the term of this patent is extended or adjusted under 35 U.S.C. 154(b) by 0 days.

(21) Appl. No.: 17/256,335

(22) PCT Filed: Jun. 27, 2019

(86) PCT No.: PCT/GB2019/000090
§ 371 (c)(1),
(2) Date: Dec. 28, 2020

(87) PCT Pub. No.: WO2020/002865
PCT Pub. Date: Jan. 2, 2020

(65) Prior Publication Data
US 2021/0146681 A1    May 20, 2021

(30) Foreign Application Priority Data
Jun. 28, 2018    (GB) ...................................... 1810587

(51) Int. Cl.
*B41J 2/03*    (2006.01)
*B41J 2/035*    (2006.01)
(Continued)

(52) U.S. Cl.
CPC ............... *B41J 2/035* (2013.01); *B41J 2/075* (2013.01); *H04N 1/00482* (2013.01); *B41J 2002/032* (2013.01); *B41J 2002/033* (2013.01)

(58) Field of Classification Search
CPC .. B41J 2/04541; B41J 2/04548; B41J 2/2121; B41J 2/04; B41J 2/14; B41J 2/01;
(Continued)

(56) References Cited

U.S. PATENT DOCUMENTS

| | | | |
|---|---|---|---|
| 4,119,973 A | 10/1978 | Stager | |
| 6,527,379 B1 * | 3/2003 | Martin | ........................ B41J 2/02 347/73 |

(Continued)

FOREIGN PATENT DOCUMENTS

| | | |
|---|---|---|
| EP | 3481797 A2 | 4/1992 |
| EP | 2166472 A1 | 3/2010 |
| EP | 2881258 A1 | 6/2015 |

*Primary Examiner* — Kristal Feggins
(74) *Attorney, Agent, or Firm* — Price Heneveld LLP

(57) ABSTRACT

A continuous inkjet printer (10, 100) has an ink drop generator (12, 112a, 112b) to generate a stream of ink drops (24), deflection means (14, 16, 18, 20, 114, 115, 116, 118a, 118b, 120) to direct each drop of the stream of ink drops either to a gutter (28) or to one of a plurality of default print positions in a stroke direction (30) on a substrate (26, 126), and input means (22, 122) to receive an indication of an offset. The deflection means, in dependence upon the indication of the offset, direct drops that would otherwise be directed to default print positions to offset print positions on a substrate (26, 126), the offset print positions being displaced in the stroke direction 30 by the offset from the default print positions. The input means (22, 122) may also receive an indication of a print height scaling factor and the deflection means (14, 16, 18, 20, 114, 115, 116, 118a, 118b, 120), in dependence upon the indication of the print height scaling factor, direct drops that would otherwise be directed to default print positions to scaled print positions on a substrate (26, 126), the scaled print positions being displaced from the origin in the stroke direction (30) by displacements corresponding to displacements from the origin of the default print positions when scaled by the print height scaling factor.

14 Claims, 2 Drawing Sheets

(51) Int. Cl.
*B41J 2/075* (2006.01)
*H04N 1/00* (2006.01)

(58) Field of Classification Search
CPC .......................... B41J 2/04505; B41J 2/04503; B41J 2/04506; B41J 2/04508; B41J 2/04573; B41J 2/04583; B41J 2002/032; B41J 2002/033; B41J 2/04593; B41J 2/04595; B41J 2/04596; B41J 2/025; B41J 2/03; B41J 2/035; B41J 2/045
See application file for complete search history.

(56) References Cited

U.S. PATENT DOCUMENTS

| | | | |
|---|---|---|---|
| 2008/0231669 A1* | 9/2008 | Brost | .......................... B41J 2/03 347/75 |
| 2012/0194586 A1 | 8/2012 | Harada et al. | |
| 2013/0249985 A1* | 9/2013 | Marcus | ...................... B41J 2/09 347/10 |

* cited by examiner

STROKE DIRECTION OFFSET ADJUSTMENT

FIELD OF THE INVENTION

This invention relates to a continuous inkjet (CIJ) printer, to a method of operating a CIJ printer, and to a computer program executable by a CIJ printer to carry out such a method.

BACKGROUND TO THE INVENTION

A CIJ printer prints an image on a substrate, typically packaging of a product on a production line, by printing a series of strokes of ink dots in a stroke direction on the substrate as the substrate moves in a transport direction perpendicular to the stroke direction.

It is often required to adjust (or introduce) an offset in the stroke direction of the series of strokes of ink dots, the offset being a displacement of each ink dot in the stroke direction from a default position on the substrate, particularly where the CIJ printer is capable of printing two strokes of ink dots at the same time, for example so as to control a size of a gap between two images printed on the substrate by the printer.

To date, such adjustment has been carried out by moving a print head of the printer relative to the substrate in the stroke direction, which requires time consuming adjustment of mounting brackets and the like, or, where the printer is capable of printing two strokes of ink dots at the same time, moving the print head towards or away from the substrate. In addition to requiring adjustment of mounting brackets and the like, this approach has the disadvantage that, as a side effect, changing the distance of the print head from the substrate changes the size of the resulting image on the substrate.

CIJ printers that can adjust print character height by adjusting the value of the charging voltage to be applied to their charging electrodes are known. US 2012/0194586, for example, is concerned with such a printer. Adjusting print character height in this way involves changing the lengths of strokes of ink dots printed on a substrate by changing the distances in the stroke direction between the ink dots of the strokes. This is different from adjusting or introducing an offset in the stroke direction, where each ink dot of a stroke is displaced by an offset in the stroke direction from a default position on the substrate, but the lengths of the strokes of ink dots printed on the substrate are unchanged.

SUMMARY OF THE INVENTION

According to a first aspect of the invention there is provided a continuous inkjet printer comprising an ink drop generator operable to generate a stream of ink drops, and deflection means operable to direct each drop of the stream of ink drops either to a gutter or to one of a plurality of default print positions in a stroke direction on a substrate, wherein the printer includes input means operable to receive an indication of an offset and the deflection means are operable, in dependence upon the indication of the offset, to direct each drop of at least a majority of the drops that would otherwise be directed to one of the default print positions to one of a plurality of offset print positions on a substrate, each offset print position corresponding to one of the default print positions and being displaced in the stroke direction by the offset from the corresponding default print position.

The invention can provide a CIJ printer that enables an offset in a stroke direction of an image printed by the printer to be adjusted without adjusting mounting brackets and the like.

In the preferred embodiments, the deflection means comprise a charge electrode operable to impart electrical charges to the ink drops, electrostatic field generating means operable to generate an electric field for deflecting charged drops, and a controller operable to control the magnitudes of the electrical charges imparted to the ink drops by the charge electrode.

The electrostatic field generating means may advantageously comprise a pair of electrodes arranged such that in use of the printer the stream of drops passes between the electrodes.

In the preferred embodiments, the electrostatic field generating means comprise a pair of elongate deflection plates arranged such that in use of the printer the stream of drops passes between and along the lengths of the deflection plates.

Where the deflection means comprise the charge electrode, electrostatic field generating means and controller, the controller is operable to direct a drop to an offset print position by causing the charge electrode to impart an electrical charge to the drop, a magnitude of the electrical charge imparted to the drop being increased or decreased by a predetermined amount in dependence upon the indication of the offset relative to a magnitude of the electrical charge that would be imparted to the drop by the charge electrode to direct the drop to the corresponding default print position.

The magnitudes of the electrical charges imparted to the drops are determined by a variable charging voltage applied to the charge electrode.

There are minimum and maximum displacements of drops in the stroke direction relative to an origin, and drops displaced by less than the minimum displacement or more than the maximum displacement will not reach a substrate.

In a typical CIJ printer, drops that are to be directed to the gutter have no electrical charge imparted to them by the charge electrode. Drops that are to be printed have electrical charges of stepwise increasing magnitude imparted to them, the magnitudes of the electrical charges determining the displacements of the drops from the origin in the stroke direction on a substrate. The drops to which the electrical charges of the least magnitude are imparted are the least deflected drops (LDDs) and the drops to which the electrical charges of the greatest magnitude are imparted are the most deflected drops (MDDs).

A negative displacement of the offset print positions in the stroke direction, i.e., towards the origin, is obtained by decreasing the magnitudes of the electrical charges imparted to the drops relative to those that would be imparted to the drops to direct them to the default print positions, whereas a positive displacement of the offset print positions in the stroke direction, i.e., away from the origin, is obtained by increasing the magnitudes of the electrical charges imparted to the drops.

The maximum negative displacement of the offset print positions obtainable by decreasing the magnitudes of the electrical charges imparted to the drops is determined by the minimum displacement of drops in the stroke direction relative to the origin, because drops that are displaced by less than the minimum displacement will collide with the gutter instead of reaching a substrate.

Where the electrostatic field generating means comprise the pair of elongate plates, the maximum positive displacement of the offset print positions obtainable by increasing the magnitudes of the electrical charges imparted to the drops is determined by the maximum displacement of drops in the stroke direction relative to the origin, because drops that are displaced by more than the maximum displacement will collide with one of the deflection plates instead of reaching a substrate.

Preferably, therefore, the input means are operable to receive an indication of an offset within a predetermined range of offsets.

In the preferred embodiments the controller operable to control the magnitudes of the electrical charges imparted to the ink drops by the charge electrode is operable to apply voltages with magnitudes between a minimum magnitude and a maximum magnitude to the charge electrode.

While various implementations are envisaged for the input means, such as a rotary switch, preferably the printer includes a graphical user interface (GUI) and the input means comprise an adjustable setting within the GUI.

Where the printer includes the GUI, the adjustable setting is preferably constrained to be adjustable only within a range corresponding to the predetermined range of offsets.

In the preferred embodiments the predetermined range of offsets correspond to a range of voltage magnitudes between the minimum magnitude and the maximum magnitude of the voltage applicable to the charge electrode by the controller.

In the preferred embodiments, the printer includes input means operable to receive an indication of a print height scaling factor and the deflection means are operable, in dependence upon the indication of the print height scaling factor, to direct a drop that would otherwise be directed to a default print position to a scaled print position on a substrate, the scaled print position being displaced from the origin in the stroke direction by a displacement corresponding to a displacement from the origin of the default print position when scaled by the print height scaling factor.

In the preferred embodiments, the deflection means are operable, in dependence upon the indication of the print height scaling factor, to direct each drop of at least a majority of the drops that would otherwise be directed to one of the default print positions to one of a plurality of scaled print positions on a substrate, each scaled print position corresponding to one of the default print positions and being displaced from the origin in the stroke direction by a displacement corresponding to a displacement from the origin of the corresponding default print position when scaled by the print height scaling factor.

Where the printer includes input means operable to receive indications of both the offset and the print height scaling factor, there is an inverse relationship between the available offset and the available print height scaling factor. That is to say, if a large print height scaling factor is specified, given that there is a maximum magnitude of voltage that can be applied to the charge electrode by the controller, the available positive offset is small. Conversely, if a large positive offset is specified, the available print height scaling factor (above 100%) is small, for the same reason.

In the preferred embodiments, the printer includes a GUI and the input means comprise adjustable settings for the offset and the print height scaling factor.

In the preferred embodiments, the adjustable settings are constrained to be adjustable only within a range determined by the printer, and the printer is operable, in response to adjustment of one of the settings for the offset and the print height scaling factor, to modify the range within which the other of the settings for the offset and the print height scaling factor is constrained to be adjustable.

The printer may advantageously comprise a further ink drop generator and further deflection means and the input means be operable to receive an indication of an offset for each deflection means, and each deflection means be operable to direct a drop that would otherwise be directed to a default print position to a respective offset print position on a substrate.

The invention can further provide a CIJ printer that enables a gap between images printed by the printer to be adjusted without adjusting mounting brackets and the like.

According to a second aspect of the invention, there is provided a method of operating a continuous inkjet printer comprising an ink drop generator operable to generate a stream of ink drops, and deflection means operable to direct each drop of the stream of drops either to a gutter or to one of a plurality of default print positions in a stroke direction on a substrate, the method comprising receiving an indication of an offset and causing the deflection means, in dependence upon the indication of the offset, to direct each drop of at least a majority of the drops that would otherwise be directed to a default print position to an offset print position on the substrate, each offset print position corresponding to one of the default print positions and being displaced in the stroke direction by the offset from the corresponding default print position.

According to a third aspect of the invention, there is provided a computer program executable by a continuous inkjet printer to cause the printer to carry out the method of the second aspect of the invention.

BRIEF DESCRIPTION OF THE DRAWINGS

The invention will now be described, by way of example, with reference to the attached drawing figures, in which.

DETAILED DESCRIPTION OF EMBODIMENTS

Figure 1:
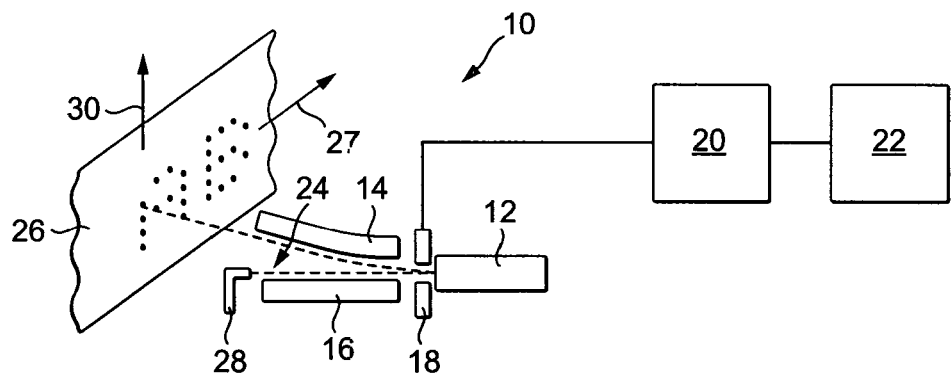
FIG. 1 is a schematic diagram of a first embodiment of a CIJ printer in accordance with the invention.

The CIJ printer 10 of FIG. 1 comprises an ink drop generator 12 connected to an ink supply (not shown), deflection means in the form of a pair of elongate deflection plates 14 and 16 connected to a high voltage power supply (not shown), a charge electrode 18 connected to a controller 20 and input means in the form of a touch screen display 22 that operates as a GUI for the controller 20.

In use of the printer, the ink drop generator 12 generates a stream of drops of ink, denoted generally by reference numeral 24. The controller 20 receives image data from a data source (not shown) and, in response to movement of a substrate 26 in a transport direction (denoted in FIG. 1 by arrow 27) relative to the printer 10, prints a series of strokes of ink dots on the substrate in accordance with the image data, by causing the charge electrode 18 to apply a 0-285 V variable charging voltage to selected ones of the drops generated by the drop generator. The resulting charged drops are deflected by an electrostatic field between the deflection plates 14 and 16 and reach the substrate 26. Ink drops to which no charging voltage is applied are caught by a gutter 28 and returned to the ink supply.

In the CIJ printer 10 shown in FIG. 1, the greater the magnitude of the variable charging voltage applied to a drop, the greater will be the deflection of that drop towards the deflection plate 14, and the greater will be the displacement of the resulting printed drop from an origin in a stroke direction (denoted in FIG. 1 by arrow 30).

The operation of the CIJ printer as so far described is conventional and will be familiar to those skilled in the CIJ printer art.

The CIJ printer 10 differs from known CIJ printers in the operation of the controller 20, which presents to a user via the touch screen display 22 an adjustable offset setting and an adjustable print height scaling factor setting.

The following description assumes that, in an initial setup step, a drop diameter D (in mm) produced by the printer on a substrate and a height h (in mm) of print produced by the printer on the substrate have been stored by the controller 20.

In normal use of the CIJ printer 10, i.e., without any adjustment to the offset setting or print height scaling factor setting, the variable voltage applied to drops that are to be printed varies between a minimum voltage V LDD of 50 V corresponding to a least deflected drop and a maximum voltage V MDD of 200 V corresponding to a most deflected drop.

As part of the initial setup step, the controller 20 calculates a deflection constant k using the formula:

$$k = (V\,MDD - V\,LDD)/(h-D)\ (V/mm)$$

Assuming for illustrative purposes a drop diameter D of 0.26 mm and a print height h of 8.4 mm, the resulting deflection constant k is 18.43 V/mm.

Assuming also that there has not yet been any adjustment of the offset setting or print height scaling factor setting, i.e., the offset setting is 0 mm and the print height scaling factor setting is 100%, the GUI shows the offset setting to be adjustable over the range −1.0 mm to +max_offset, where max_offset is calculated using the formula:

$$\begin{aligned}\text{max\_offset} &= ROUNDDOWN(((\text{max\_charge\_electrode\_voltage} - \\ &\quad (V\,MDD * \text{print\_height\_scaling\_factor}/100))/k), 1) \\ &= ROUNDDOWN(((285 - (250*100/100))/k), 1) \\ &= 4.6\,mm\end{aligned}$$

The GUI shows the print height scaling factor setting to be adjustable over the range 60% to max_print_height_scaling_factor, where max_print_height_scaling_factor is calculated using the formula:

$$\begin{aligned}\text{max\_print\_height\_scaling\_factor} &= ROUNDDOWN((100 * \\ &\quad (\text{max\_charge\_electrode\_voltage}/ \\ &\quad ((V\,MDD) + (\text{offset\_setting} * k)))), 0) \\ &= ROUNDDOWN(((100*(285/ \\ &\quad ((200) + (0*k)))), 0) \\ &= 142\%\end{aligned}$$

If the print height scaling factor setting were adjusted to 60% while maintaining the offset setting at 0 mm, the GUI would show the offset setting to be adjustable over the range −1.0 mm to +8.9 mm, whereas if the print height scaling factor setting were adjusted to 140% while maintaining the offset setting at 0 mm, the GUI would show the offset setting to be adjustable over the range −1.0 mm to +0.2 mm.

If, on the other hand, the offset setting were adjusted to −1.0 mm while maintaining the print height scaling factor setting at 100%, the GUI would show the print height scaling factor to be adjustable over the range 60% to 156%, whereas if the offset setting were adjusted to +4.0 mm while maintaining the print height scaling factor setting at 100%, the GUI would show the print height scaling factor to be adjustable over the range 60% to 104%.

For the avoidance of doubt, the lower limits of adjustment of the offset setting and the print height scaling factor setting are fixed at −1.0 mm and 60%, respectively, by the firmware of the printer, and do not change in response to adjustment of the other setting.

By way of illustration, if the offset setting is set to 0 mm and the print height scaling factor setting is set to 100%, in order to print a most deflected drop (MDD), a voltage of 200 V is applied to the drop by the charge electrode 18, which causes the drop to be printed at a default MDD drop position on the substrate.

If the offset setting is set to +2.0 mm but the print height scaling factor setting remains set to 100%, a voltage of 236.86 V (200+(2*18.43)) is applied to the drop, which causes the drop to be printed at an offset MDD drop position, which is displaced by 2 mm in the stroke direction from the default MDD drop position.

If the print height scaling factor setting is set to 120% but the offset setting remains set to 0 mm, a voltage of 240 V (200*120%) is applied to the drop, which causes the drop to be printed at a scaled MDD drop position, which is displaced by 20% further in the stroke direction from a notional origin than the default MDD drop position.

Figure 2:
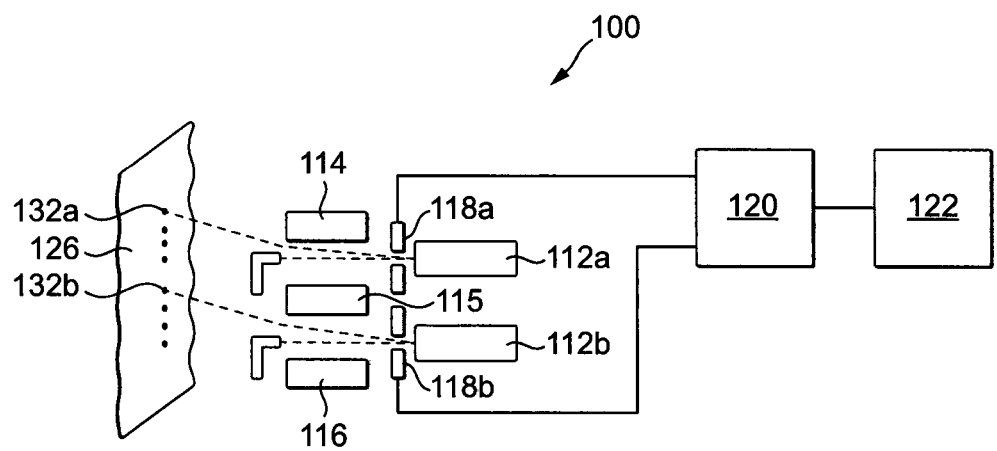
FIG. 2 is a schematic diagram of a second embodiment of a CIJ printer in accordance with the invention.

The CIJ printer 100 of FIG. 2 comprises first and second ink drop generators 112a and 112b connected to an ink supply (not shown), respective first and second elongate deflection plates 114 and 116 connected to a high voltage power supply (not shown), a common elongate deflection plate 115 connected to electrical ground, respective charge electrodes 118a and 118b connected to a controller 120 and a touch screen display 122 that operates as a GUI for the controller 120.

The operation of the printer 100 of FIG. 2 is the same as that of printer 10 of FIG. 1, except that the GUI presents to the user an adjustable offset setting and an adjustable print height scaling factor setting for each of the first and second drop generators 112a and 112b, and the controller 120 controls the voltages applied to the drops by the charge electrodes 118a and 118b, so as to control an offset in the stroke direction and print height scaling factor of two parallel images printed on a substrate 126 by the printer 100. It will be apparent that the voltage applied to a drop by charge electrode 118a to print a particular dot (e.g., that denoted by reference numeral 132a in FIG. 2) of a stroke will have the same magnitude as, but opposite polarity to, the voltage applied to a drop by charge electrode 118b to print the corresponding particular dot (i.e., that denoted by reference numeral 132b in FIG. 2) of a stroke.

Figure 3:
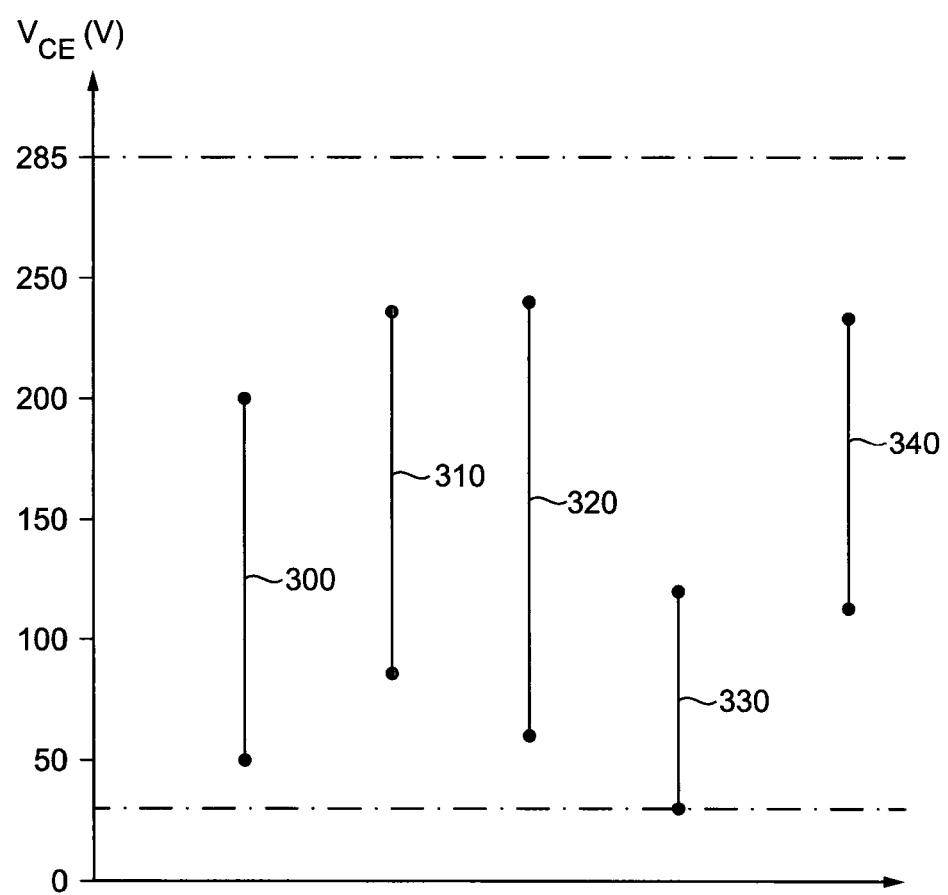
FIG. 3 is a graph of charge electrode voltage ranges for various print height scaling factor and offset settings.

FIG. 3 shows the ranges of charge electrode voltages ($V_{CE}$) applied to ink drops by the charge electrode for various print height scaling factor and offset settings. The upper end of each of the voltage ranges 300, 310, 320, 330 and 340 represents the charge electrode voltage that would be applied to a most deflected drop, and the lower end represents the charge electrode voltage that would be applied to a least deflected drop.

The range denoted by reference numeral 300 is 50 V to 200 V, which corresponds to an offset setting of 0 mm and a print height scaling factor of 100%.

The range denoted by reference numeral 310 is 86.86 V to 236.86 V, which corresponds to an offset setting of +2.0 mm and a print height scaling factor of 100%.

The range denoted by reference numeral 320 is 60 V to 240 V, which corresponds to an offset setting of 0 mm and a print height scaling factor of 120%.

The range denoted by reference numeral 330 is 30 V to 120 V, which corresponds to an offset setting of 0 mm and a print height scaling factor of 60%.

The range denoted by reference numeral 340 is 113.72 V to 233.72 V, which corresponds to an offset setting of +4.0 mm and a print height scaling factor of 80%.

It will be apparent that the above description relates only to two embodiments of the invention, and that the invention encompasses other embodiments as defined by the claims.

The invention claimed is:

1. A continuous inkjet printer comprising an ink drop generator operable to generate a stream of ink drops, and deflection means operable to direct each drop of the stream of ink drops either to a gutter or to one of a plurality of default print positions in a stroke direction on a substrate, wherein the printer includes input means operable to receive an indication of an offset and the deflection means are operable, in dependence upon the indication of the offset, to direct each drop of at least a majority of the drops that would otherwise be directed to a default print position to an offset print position on a substrate, each offset print position corresponding to one of the default print positions and being displaced in the stroke direction by the offset from the corresponding default print position.

2. A continuous inkjet printer according to claim 1, wherein the deflection means are operable, in dependence upon the indication of the offset, to direct each drop that would otherwise be directed to one of the default print positions to one of a plurality of offset print positions on a substrate.

3. A continuous inkjet printer according to claim 1, wherein the deflection means comprise a charge electrode operable to impart electrical charges to the ink drops, electrostatic field generating means operable to generate an electric field for deflecting charged drops, and a controller operable to control the magnitudes of the electrical charges imparted to the ink drops by the charge electrode.

4. A continuous inkjet printer according to claim 1, wherein the electrostatic field generating means comprise a pair of elongate deflection plates arranged such that in use of the printer the stream of drops passes between and substantially parallel to the lengths of the deflection plates.

5. A continuous inkjet printer according to claim 1, wherein the input means are operable to receive an indication of an offset within a predetermined range of offsets.

6. A continuous inkjet printer according to claim 5, wherein the printer includes a graphical user interface (GUI) and the input means comprise an adjustable setting within the GUI.

7. A continuous inkjet printer according to claim 6, wherein the adjustable setting is constrained to be adjustable only within a range corresponding to the predetermined range of offsets.

8. A continuous inkjet printer according to claim 1, wherein the printer includes input means operable to receive an indication of a print height scaling factor and the deflection means are operable, in dependence upon the indication of the print height scaling factor, to direct a drop that would otherwise be directed to a default print position to a scaled print position on a substrate, the scaled print position being displaced from the origin in the stroke direction by a displacement corresponding to a displacement from the origin of the default print position when scaled by the print height scaling factor.

9. A continuous inkjet printer according to claim 8, wherein the deflection means are operable, in dependence upon the indication of the print height scaling factor, to direct each drop that would otherwise be directed to one of the default print positions to one of a plurality of scaled print positions on a substrate, each scaled print position corresponding to one of the default print positions and being displaced from the origin in the stroke direction by a displacement corresponding to a displacement from the origin of the corresponding default print position when scaled by the print height scaling factor.

10. A continuous inkjet printer according to claim 8, wherein the printer includes a GUI and the input means comprise adjustable settings for the offset and the print height scaling factor.

11. A continuous inkjet printer according to claim 10, wherein the adjustable settings are constrained to be adjustable only within a range determined by the printer, and printer is operable, in response to adjustment of one of the settings for the offset and the print height scaling factor, to modify the range within which the other of the settings for the offset and the print height scaling factor is constrained to be adjustable.

12. A continuous inkjet printer according to claim 1, wherein the printer comprises a further ink drop generator and further deflection means and the input means are operable to receive an indication of an offset for each deflection means, and each deflection means are operable to direct a drop that would otherwise be directed to a default print position to a respective offset print position on a substrate.

13. A method of operating a continuous inkjet printer comprising an ink drop generator operable to generate a stream of ink drops, and deflection means operable to direct each drop of the stream of drops either to a gutter or to one of a plurality of default print positions in a stroke direction on a substrate, the method comprising receiving an indication of an offset and causing the deflection means, in dependence upon the indication of the offset, to direct each drop of at least a majority of the drops that would otherwise be directed to a default print position to an offset print position on the substrate, each offset print position corresponding to one of the default print positions and being displaced in the stroke direction by the offset from the corresponding default print position.

14. A non-transitory tangible computer readable medium having stored thereon software instructions that, when executed by a processor of a continuous inkjet printer comprising an ink drop generator operable to generate a stream of ink drops, and deflection means operable to direct each drop of the stream of drops either to a gutter or to one of a plurality of default print positions in a stroke direction on a substrate, cause the processor to control the printer by executing the steps comprising:

receiving an indication of an offset and causing the deflection means, in dependence upon the indication of the offset, to direct each drop of at least a majority of the drops that would otherwise be directed to a default print position to an offset print position on the substrate, each offset print position corresponding to one of the default print positions and being displaced in the stroke direction by the offset from the corresponding default print position.

* * * * *